US012619643B2

(12) United States Patent (10) Patent No.: US 12,619,643 B2
Guan et al. (45) Date of Patent: May 5, 2026

(54) DATA DISPLAY METHOD, DEVICE, COMPUTER APPARATUS AND SYSTEM

(71) Applicant: Beijing Zitiao Network Technology Co., Ltd., Beijing (CN)

(72) Inventors: Huiran Guan, Beijing (CN); Jinghua Li, Beijing (CN); Pan Tan, Beijing (CN); Zhuodong Huang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/526,692

(22) Filed: Dec. 1, 2023

(65) Prior Publication Data

US 2024/0220522 A1 Jul. 4, 2024

(30) Foreign Application Priority Data

Dec. 29, 2022 (CN) .......................... 202211710580.4

(51) Int. Cl.
 *G06F 16/334* (2025.01)
 *G06F 16/31* (2019.01)
(52) U.S. Cl.
 CPC ........ *G06F 16/3344* (2019.01); *G06F 16/313* (2019.01)
(58) Field of Classification Search
 CPC ............................ G06F 16/3344; G06F 16/313
 See application file for complete search history.

(56) References Cited

U.S. PATENT DOCUMENTS

| | | | | |
|---|---|---|---|---|
| 2002/0042923 A1* | 4/2002 | Asmussen | .......... | H04N 21/6543 |
| | | | | 348/E5.103 |
| 2007/0106658 A1* | 5/2007 | Ferrari | .................. | G06F 16/904 |
| | | | | 707/999.005 |
| 2014/0310255 A1* | 10/2014 | Cardell | ............. | G06F 16/90324 |
| | | | | 707/706 |

(Continued)

FOREIGN PATENT DOCUMENTS

| | | |
|---|---|---|
| CN | 106156114 A | 11/2016 |
| CN | 109857853 A | 6/2019 |

(Continued)

OTHER PUBLICATIONS

Notice of Opinion on the First Review for Chinese Application No. 202211710580.4, mailed on Dec. 11, 2024, 18 pages.

*Primary Examiner* — Sherief Badawi
*Assistant Examiner* — J Mitchell Curran

(57) ABSTRACT

The present disclosure provides a data display method, device, computer apparatus and system, wherein the method comprises: receiving search information in response to a trigger operation on a search tag, wherein the search information corresponds to at least one first book attribute dimension, and the first book attribute dimension is associated with at least one second book attribute dimension; acquiring a search associative word based on the search information, wherein the search associative word includes a first associative word and a second associative word, the first associative word is determined according to the search information and the first book attribute dimension, and the second associative word is determined according to the second book attribute dimension; displaying the search associative words in an other interface area than the search tag.

16 Claims, 4 Drawing Sheets

(56)                References Cited

U.S. PATENT DOCUMENTS

| | | | | |
|---|---|---|---|---|
| 2014/0330866 A1* | 11/2014 | Hess | ................. | G06F 16/24575 |
| | | | | 707/771 |
| 2018/0365324 A1* | 12/2018 | Finberg | ................. | G06N 20/00 |
| 2022/0222281 A1* | 7/2022 | Eom | .................... | G06F 16/334 |

FOREIGN PATENT DOCUMENTS

| | | | | | |
|---|---|---|---|---|---|
| CN | 111680047 | A | | 9/2020 | |
| CN | 111723282 | A | | 9/2020 | |
| CN | 113378061 | A | | 9/2021 | |
| CN | 113961794 | A * | 1/2022 | .......... | G06F 3/0483 |
| CN | 115129922 | A | | 9/2022 | |
| JP | 2010205224 | A | | 9/2010 | |

\* cited by examiner

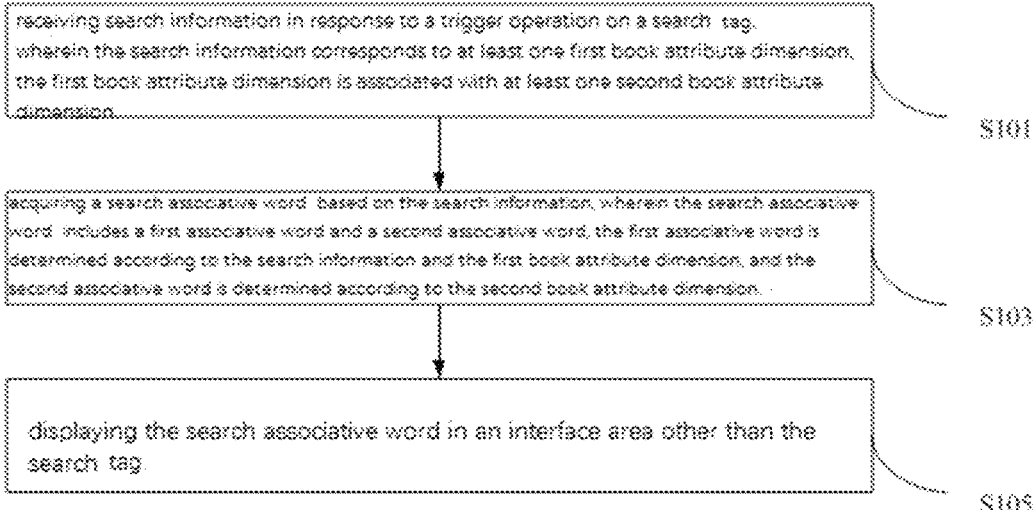

receiving search information in response to a trigger operation on a search tag, wherein the search information corresponds to at least one first book attribute dimension, the first book attribute dimension is associated with at least one second book attribute dimension

S101 acquiring a search associative word based on the search information, wherein the search associative word includes a first associative word and a second associative word, the first associative word is determined according to the search information and the first book attribute dimension, and the second associative word is determined according to the second book attribute dimension

S103 displaying the search associative word in an interface area other than the search tag

DATA DISPLAY METHOD, DEVICE, COMPUTER APPARATUS AND SYSTEM

CROSS REFERENCE TO RELATED APPLICATIONS

This application claims the benefit of priority to Chinese Application No. 202211710580.4, filed on Dec. 29, 2022, the entire contents of which are incorporated herein by reference.

TECHNICAL FIELD

The present disclosure relates to the technical field of computer, and in particular, a data display method, device, computer apparatus and system.

BACKGROUND ART

At present, in an existing online reading application, a user can search the corresponding books, articles and other information with a search function in the application. In an existing search function, after a search word input by the user are detected, content associated with the search word can be searched. When semantic information of the search word input by the user is relatively simple, search result of the search word is also relatively simple. Therefore, when a user has multi-intention search demands, existing search methods cannot meet the user's search needs.

SUMMARY OF THE INVENTION

Embodiments of the present disclosure at least provide a data display method, device, computer apparatus and system.

On one aspect, an embodiment of the present disclosure provides a data display method, comprising: receiving search information in response to a trigger operation on a search tag; wherein the search information corresponds to at least one first book attribute dimension, and the first book attribute dimension is associated with at least one second book attribute dimension; acquiring a search associative word based on the search information; wherein the search associative word includes a first associative word and a second associative word, the first associative word is determined according to the search information and the first book attribute dimension, and the second associative word is determined according to the second book attribute dimension; displaying the search associative words in an interface area other than the search tag.

In an alternative embodiment, the at least one first book attribute dimension is determined by: determining first book information including at least part of the search information; determining candidate book attribute dimensions based on the information dimension to which the first book information belongs; determining the first book attribute dimension based on the candidate book attribute dimension that matches a search target of the search information among the candidate book attribute dimensions.

In an alternative embodiment, the second book attribute dimension associated with each of the first book attribute dimensions is determined by: determining feature information of each preset book feature, wherein the feature information is used for indicating feature associative information between the first book attribute dimension and the preset book feature, and/or for indicating the probability that the search target of the search information is the book information corresponding to the preset book feature; determining the second book attribute dimension associated with the first book attribute dimension based on the feature information.

In an alternative embodiment, the method further includes: determining a target book that matches the search information; the determining the second book attribute dimension associated with the first book attribute dimension based on the feature information includes: determining the target feature information of the target book for each of the preset book features, and determining the second book attribute dimension associated with the first book attribute dimension based on the target feature information.

In an alternative embodiment, the first book attribute dimension comprises a plurality of first book attribute dimensions, and a plurality of second book attribute dimensions associated with different said first book attribute dimension are not completely the same; the acquiring search associative word based on the search information includes: acquiring a search associative word corresponding to each first book attribute dimension based on the search information to obtain a plurality of search associative words, wherein the search associative word corresponding to each first book attribute dimension includes a first associative word and a plurality of second associative words, and the plurality of second associative words are determined according to each second book attribute dimension associated with the first book attribute dimension.

In an alternative embodiment, the first search subject and the second associative word are determined by: determining the alternative associative word including the search information as the first associative word among the alternative associative words corresponding to the first book attribute dimension; determining an alternative associative word of the alternative associative words corresponding to the second book attribute dimension that includes the same feature as the first associative word is the second associative word.

In an alternative embodiment, the displaying the search associative words in an interface area other than the search tag includes: determining a display tag of the search associative word, wherein, the display tag is a tag for indicating the book attribute dimension to which the search associative word belongs; displaying the search associative word in the other interface area according to the display tag.

In an alternative embodiment, the determining the display tag of the search associative word includes: determining the display tag of the first associative word based on the first book attribute dimension; determining the display tag of the second associative word based on the second book attribute dimension, wherein, the display tags corresponding to different book attribute dimensions are different.

In an alternative embodiment, the displaying the search associative words in the other interface area according to the display tags includes: determining a splicing style of the first associative word and the second associative word based on the first book attribute dimension and the second book attribute dimension; displaying the search associative words in a first region of the other interface area according to the splicing style, and displaying the display tags of the search associative words in a second region of the other interface area, wherein the second region is a region adjacent to the first region.

In an alternative embodiment, the determining the splicing style of the first associative word and the second associative word based on the first book attribute dimension and the second book attribute dimension includes: determining hierarchical information between the first associative word and the second associative word in a case where the first book attribute dimension and the second book attribute dimension are the same; determining a splicing order of the first associative word and the second associative word based on the hierarchical information, and determining the splicing style based on the splicing order.

On a second aspect, an embodiment of the present disclosure provides a data display device, comprising: a receiving unit for receiving search information in response to a trigger operation on a search tag; wherein the search information corresponds to at least one first book attribute dimension, and the first book attribute dimension is associated with at least one second book attribute dimension; an acquiring unit for acquiring search associative words based on the search information; wherein the search associative words include a first associative word and a second associative word, the first associative word is determined according to the search information and the first book attribute dimension, and the second associative word is determined according to the second book attribute dimension; a display unit for displaying the search associative words in an interface area other than the search tag.

On a third aspect, an embodiment of the present disclosure further provides a computer apparatus including a processor, a memory and a bus, wherein the memory is configured to store a machine-readable instruction executable by the processor, wherein, when the computer apparatus operates, the processor communicates with the memory through the bus, and wherein, when the machine-readable instruction is executed by the processor, steps in the first aspect or any possible embodiment of the first aspect are executed.

On a fourth aspect, an embodiment of the present disclosure further provides a computer-readable storage medium, on which a computer program is stored, and the computer program, when executed by the processor, steps in the first aspect, or any possible embodiment of the first aspect are executed.

In the embodiment of the present disclosure, after the trigger operation on the search tag is detected, the search information corresponding to at least one first book attribute dimension can be received, wherein the first book attribute dimension is associated with at least one second book attribute dimension. Thereafter, the search associative word can be obtained based on the search information, and the search associative word includes the first associative word and the second associative word. Wherein, the first associative word is determined according to the search information and the first book attribute dimension, and the second associative word is determined according to the second book attribute dimension. After the search associative words are acquired, the search associative words can be displayed in an interface area other than the search tag.

In order to make the above objects, features and advantages of the present disclosure more obvious and easier to understand, a detailed description of preferred embodiments a given below, with reference to the attached drawings.

BRIEF DESCRIPTION OF THE DRAWINGS

In order to explain the technical solutions of the embodiments of the present disclosure more clearly, a brief introduction to drawings needed in the embodiments is given below, which drawings are incorporated into and constitute part of the description. These drawings show the embodiments in line with the present disclosure and serve to explain the technical solutions of the present disclosure, together with the description. It should be understood that the below drawings illustrate only some embodiments of the present disclosure and therefore should not be considered as limiting the scope of the disclosure. Those skilled in the art can obtain further related drawings according to these drawings without any creative effort.

FIG. 1 shows a flowchart of a data display method provided by an embodiment of the present disclosure;

DETAILED DESCRIPTION

Figure 2:
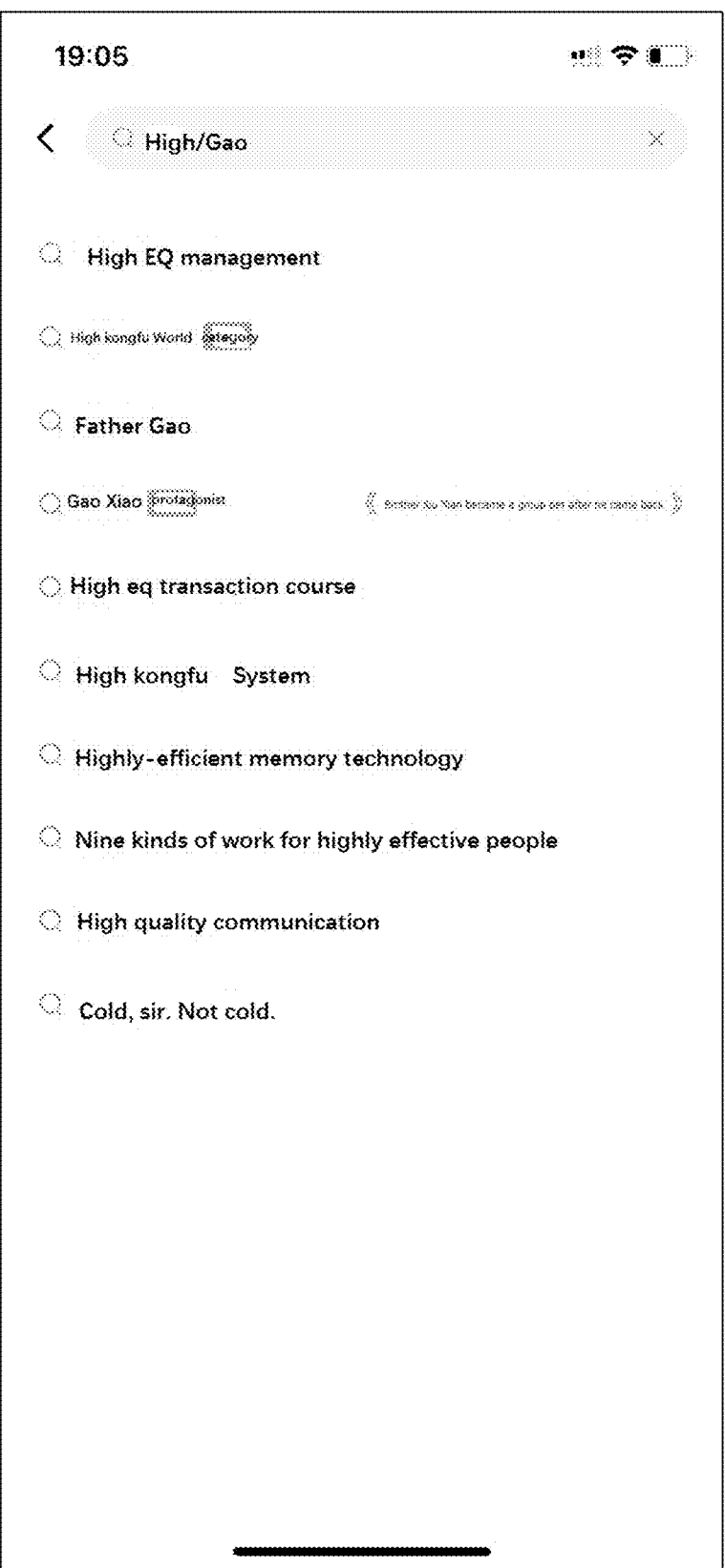
FIG. 2 is a schematic diagram showing the display effect of a search associative word provided by an embodiment of the present disclosure.

In order to make the objectives, technical solutions and advantages of the embodiments of the present disclosure more clear, with reference to the drawings of the embodiments of the present disclosure, a clear and complete description is given below for the technical solutions of the embodiments of the present disclosure. Obviously, the embodiments described below are only part of the embodiments, rather than all of the embodiments. Components of the embodiments of the present disclosure generally described and illustrated in the drawings herein may be arranged and designed in various different configurations. Therefore, the following detailed description of the embodiments of the disclosure provided in the accompanying drawings is not intended to limit the scope of the claimed disclosure, but merely represents selected embodiments of the present disclosure. All the other embodiments that can be obtained by a person skilled in the art based on the embodiments of the present disclosure without any creative effort are included in the protection scope of the present disclosure.

It should be noted that, as like reference signs in the below drawings denote like elements, once an element is defined in a figure, it does not need to make further definition and explanation for it in a subsequent drawing.

In this context, the term "and/or" only describes an associative relationship, which means that there can be three kinds of relationships, for example, A and/or B, which can mean that A exists alone, A and B exist at the same time, and B exists alone. Besides, in this context, the term "at least one" means any one or any combination of at least two of a variety, for example, including at least one of A, B and C can represent including any one or more elements selected from the group consisting of A, B and C.

It is found through research that, at present, in an existing online reading application, a user can search the corresponding books, articles and other information with a search function in the application. In an existing search function, after a search word input by the user are detected, content associated with the search word can be searched. When semantic information of the search word input by the user is relatively simple, search result of the search word is also relatively simple. Therefore, when a user has multi-intention search demands, existing search methods cannot meet the user's search needs.

Based on the above research, the present disclosure provides a data display method, device, computer apparatus and system. In the embodiment of the present disclosure, after the trigger operation on the search tag is detected, the search information corresponding to at least one first book attribute dimension can be received, wherein the first book attribute dimension is associated with at least one second book attribute dimension. Thereafter, the search associative word can be obtained based on the search information, and the search associative word includes the first associative word and the second associative word. Wherein, the first associative word is determined according to the search information and the first book attribute dimension, and the second associative word is determined according to the second book attribute dimension. After the search associative words are acquired, the search associative words can be displayed in an interface area other than the search tag.

In the embodiment of the present disclosure, by arranging the first book attribute dimension to be associated with at least one second book attribute dimension, when the search information corresponding to at least one book attribute dimension is received, a first associative word is determined based on a first book attribute dimension, and a second associative word is determined based on a second book attribute dimension associated with the first book attribute dimension. Thereafter, the first associative word and the second associative word can be displayed for a user at the same time. By such a processing manner, search associative words of search information can be enriched, and associative words of various attribute dimensions can be acquired, so as to meet the diversified search needs of the user.

In order to facilitate the understanding of this embodiment, firstly, a data display method disclosed in the embodiment of this disclosure is introduced in detail. A executing subject of the data display method provided by the embodiment of the present disclosure is generally a computer apparatus with certain computing power, which computer apparatus includes, for example: terminal equipment or server or other processing equipment, the terminal equipment can be user equipment (UE), mobile device, user terminal, terminal, cellular phone, cordless phone, Personal Digital Assistant (PDA), handheld device, computing device, vehicle-mounted device, wearable device, etc. In some possible implementations, the data display method can be implemented by a processor calling computer-readable instructions stored in a memory.

Embodiment 1

Referring to FIG. 1, it shows a flowchart of a data display method provided by an embodiment of the present disclosure, the method including steps S101~S105, wherein:

S101: receiving search information in response to a trigger operation on a search tag, wherein the search information corresponds to at least one first book attribute dimension, the first book attribute dimension is associated with at least one second book attribute dimension.

Here, the search tag can be a search tag such as a "search box" or "magnifying glass" in the search page. After the user's triggering operation on the search tag is detected, the search information input by the user in the search tag can be received.

After receiving the search information, the search information can be sent to the server. After acquiring the search information, the server can determine a search associative word for the search information, wherein the search associative word includes a first associative word and a second associative word. Next, the server can send the search associative word to the client and display the search associative word on the search page of the client.

Here, the search information can be a single word, a plurality of words, a single term, a plurality of terms, or at least one letter, and the present disclosure does not specifically limit the search information.

In the embodiment of the present disclosure, the first book attribute dimension can be such a dimension as book title, author name, book category, protagonist name, or the like; the second book attribute dimension can be such a dimension as author name, book category, book title, protagonist name or the like. Wherein at least one second book attribute dimension associated with the first book attribute dimension is different from the first book attribute dimension.

S103: acquiring a search associative word based on the search information, wherein the search associative word includes a first associative word and a second associative word, the first associative word is determined according to the search information and the first book attribute dimension, and the second associative word is determined according to the second book attribute dimension.

In the embodiment of the present disclosure, after acquiring the search information, the server can determine at least one first book attribute dimension based on the search information, then determine the first associative word based on the search information and the first book attribute dimension, and determine the second associative word based on the second book attribute dimension. Then, the first associative word and the second associative word are fed back to the client.

Here, the first associative word can be a word that includes the search information and belongs to the first book attribute dimension. For example, if the search information is "high", here, terms including "high" can be found from at least one first book attribute dimension, for example, the book title "High-quality communication" can be found. Here, the first associative word may also include all the search information, and may also include part of the search information, which is not specifically limited in the present disclosure. Besides, the first associative word can also be a word that includes synonyms of the search information and that belongs to the first book attribute dimension.

After the first associative word is determined, the related second book attribute dimension can be determined according to the first book attribute dimension to which the first associative word belongs, and then the second associative word can be determined from the second book attribute dimension. For example, if the first associative word is the book title "High-quality communication" and the second book attribute dimension associated with the title is the author's name, then the second associative word is the author's name of the "high-quality communication".

S105: displaying the search associative word in an interface area other than the search tag.

Here, an interface area other than the search tag can be an interface area below the search tag in the search page. For example, as shown in FIG. 2, the first associative word and the second associative word can be displayed in the interface area below the search tag in the search page.

In the embodiment of the present disclosure, after the trigger operation on the search tag is detected, the search information corresponding to at least one first book attribute dimension can be received, wherein the first book attribute dimension is associated with at least one second book attribute dimension. Thereafter, the search associative word can be obtained based on the search information, and the search associative word includes the first associative word and the second associative word. Wherein, the first associative word is determined according to the search information and the first book attribute dimension, and the second associative word is determined according to the second book attribute dimension. After the search associative words are acquired, the search associative words can be displayed in an interface area other than the search tag.

In the embodiment of the present disclosure, by arranging the first book attribute dimension to be associated with at least one second book attribute dimension, when the search information corresponding to at least one book attribute dimension is received, a first associative word is determined based on a first book attribute dimension, and a second associative word is determined based on a second book attribute dimension associated with the first book attribute dimension. Thereafter, the first associative word and the second associative word can be displayed for a user at the same time. By such a processing manner, search associative words of search information can be enriched, and associative words of various attribute dimensions can be acquired, so as to meet the diversified search needs of the user.

In an alternative embodiment, the at least one first book attribute dimension can be determined by the below method, including particularly steps of the following:

Step S11: determining first book information including at least part of the search information;

Step S12: determining candidate book attribute dimensions based on the information dimension to which the first book information belongs;

Step S13: determining the first book attribute dimension based on a candidate book attribute dimension that matches a search target of the search information among the candidate book attribute dimensions.

In the embodiment of the present disclosure, firstly, acquiring a preset book information, wherein the preset book information belongs to at least one information dimension. Thereafter, the preset book information including all or part of the search information can be determined in the preset book information, and the preset book information can be determined as a first book information; and the information dimension to which the first book information belongs is determined as a candidate book attribute dimension.

For example, there is preset book information including the search information in both the information dimensions of book title and author name. Here, both the book title and the author name can be determined as candidate book attribute dimensions. Therefore, the candidate book attribute dimension can comprise one or more candidate book attribute dimensions.

Here, the user's search intention can be determined according to the search information, so that the search target of the search information can be determined based on the search intention. Thereafter, the candidate book attribute dimension matching the search target among the candidate book attribute dimensions can be determined as the first book attribute dimension.

In actual implementation, the user's search intention can be determined according to the user's historical search records at the client. For example, the user's search intention is "search romance books by book title". Here, the search target can be determined as "book title", and then, the candidate book attribute dimension "book title" matching this "book title" can be determined as the first book attribute dimension.

After determining the first book attribute dimension, one can determine the first associative word that includes search information and belongs to the first book attribute dimension.

In the above implementation, the first associative word that matches the user's search intention can be recommended to the user more accurately, thus improving the overall search efficiency of the user.

In an alternative embodiment, the second book attribute dimension associated with the each of said first book attribute dimensions can be determined by the below method, including particularly steps of the following:

Step S21: determining feature information of each preset book feature, wherein the feature information is used for indicating feature associative information between the first book attribute dimension and the preset book feature, and/or for indicating the probability that the search target of the search information is the book information corresponding to the preset book feature;

Step S22: determining the second book attribute dimension associated with the first book attribute dimension based on the feature information.

Here, the preset book feature includes such features as book title, book category, protagonist name, author name and so on. Among them, the feature information of the preset book feature can include feature associative relationship and/or probability associative relationship, which is the associative relationship between the preset first book attribute dimension and the preset book feature, and the probability associative relationship includes the probability that the book information corresponding to the preset book feature is the search target. Here, the second book attribute dimension associated with the first book attribute dimension can be determined based on the feature associative relationship and/or the probability association relationship, which will be described in detail below.

Instance 1: Feature Associative Relationship

In the embodiment of the present disclosure, the associative relationship between the first book attribute dimension and the preset book features can be preset. For example, the following associative relationships can be preset:

Associative relationship 1: protagonist name (the first book attribute dimension)+book title;

Associative relationship 2: category name (the first book attribute dimension)+category name;

Associative relationship 3: book title (the first book attribute dimension)+author name;

After acquiring said feature associative relationship, the first book attribute dimension of the first associative word can be searched based on said feature associative relationship, and the preset book feature having associative relationship with the first book attribute dimension can be determined. Assuming that the first book attribute dimension is the book title, it can be known from said associative relationship that the preset book feature having associative relationship with the book title is the author's name. Here, the author name can be determined as the second book attribute dimension.

Instance 2: Probability Associative Relationship

In the embodiment of the present disclosure, the probability associative relationship is used to indicate the probability that the search target of the search information is the book information corresponding to the preset book feature, in a case where the first book attribute dimension corresponding to the search information is determined. Here, the probability associative relationship can be determined based on the user's consumption data of books.

For example, the search information input by the user is "high", and the first book attribute dimension corresponding to this search information is the character name. In this case, the probability that the user's search target is the book title XXX corresponding to the character name (preset book feature) or the probability that the user's search target is the author name of the book (preset book feature) can be determined. Thereafter, the preset book feature with higher probability can be determined as the second book attribute dimension associated with the first book attribute dimension.

On the basis of the above steps S21 and S22, the method provided by the embodiment of the present disclosure further includes a step of the following: determining a target book that matches the search information.

Here, the step S22 of determining the second book attribute dimension associated with the first book attribute dimension based on the feature information includes a step of the following: determining the target feature information of the target book for each of the preset book features, and determining the second book attribute dimension associated with the first book attribute dimension based on the target feature information.

In the embodiment of the present disclosure, in order to improve the accuracy of determining the second book attribute dimension, a target book that matches the search information can be also determined, and then, the second book attribute dimension associated with the first book attribute dimension can be determined with reference to the target book.

In actual implementation, after receiving the search information, the first book attribute dimension corresponding to the search information can be determined in the manner as described above. In case where the first book attribute dimension is determined to be the book title, the target book is determined based on the book title. In case where the first book attribute dimension is determined not to be the book title, a matching target book can be determined based on the first book attribute dimension.

After the target book is determined, preset book features of the target book can be determined. For example, the book title, character name, author name, book category and other features of the target book can be determined. Thereafter, the feature associative relationship between the preset book feature of the target book and the first book attribute dimension can be determined, and/or the probability that the book information corresponding to each preset book feature of the target book is the search target under the first book attribute dimension can be determined (i.e., the probability associative relationship). Here, the feature associative relationship and probability associative relationship can be understood as the target feature information of the target book for each preset book feature. In actual implementation, the feature associative relationship between each preset book feature of the target book and the first book attribute dimension can be determined according to the preset associative relationship. Here, the probability associative relationship can also be determined based on the user's operation record of the target book, wherein, the operation record includes various types of operation records such as reading record of the target book, search record of the target book, search record of each character in the target book, search record of the author of the target book, search record of the book title of the target book, etc. Through statistical algorithm, the operation records can be statistically analyzed, so as to calculate the probability that each preset book feature of the target book is the search target under the first book attribute dimension. Then, the second book attribute dimension associated with the first book attribute dimension is determined based on the preset book feature with higher probability. In the prior art, when a user inputs search information on a search page, search associative words usually displayed on the search page are single subject associative words, which can no longer meet the diversified search requirements of the user. In the embodiment of the present disclosure, after the second book attribute dimension associated with the first book attribute dimension is determined, the second associative word can be determined based on the second book attribute dimension, so that associative words corresponding to various book attribute dimensions can be determined for the user, and the diversified search requirements of the user can be met while improving the user's search efficiency for books.

In an alternative embodiment, the first book attribute dimension comprises a plurality of first book attribute dimensions, and a plurality of second book attribute dimensions associated with different first book attribute dimensions are not completely the same.

In this case, the step S103 of acquiring a search associative word based on the search information includes particularly a step of the following:

acquiring a search associative word corresponding to each first book attribute dimension based on the search information to obtain a plurality of search associative words, wherein the search associative word corresponding to each first book attribute dimension includes a first associative word and a plurality of second associative words, and the plurality of second associative words are determined according to each second book attribute dimension associated with the first book attribute dimension.

In the embodiment of the present disclosure, if it is determined that the first book attribute dimension comprises a plurality of first book attribute dimensions, and a plurality of second book attribute dimensions are associated with each first book attribute dimension, the server can determine corresponding search association words for each first book attribute dimension and a plurality of second book attribute dimensions associated with the first book attribute dimension, and here, the search associative word can include a first associative word and a plurality of second associative words.

In the embodiment of the present disclosure, after determining the first book attribute dimension and the second book attribute dimension, a first associative word can be determined based on the search information and the first book attribute dimension, and a second associative word can be determined based on the second book attribute dimension.

In an alternative embodiment, the first search subject and the second associative word can be determined by the below method, including particularly steps of the following:

Step S31: determining an alternative associative word that includes the search information as a first associative word among the alternative associative words corresponding to the first book attribute dimension;

Step S32: determining that an alternative associative word that includes the same feature as the first associative word among the alternative associative words corresponding to the second book attribute dimension is the second associative word.

In the embodiment of the present disclosure, corresponding alternative associative words can be preset for the first book attribute dimension. For example, the first book attribute dimension comprises a book title and a character name, and here, corresponding alternative book title (alternative associative word) can be set for the first book attribute dimension (book title), and corresponding alternative character name (alternative associative word) can be set for the first book attribute dimension (character name).

Next, an alternative associative word including at least part of the search information can be determined among the alternative associative words corresponding to the first book attribute dimension, and the alternative associative word can be determined as the first associative word.

Here, all the alternative associative words corresponding to the first book attribute dimension can be classified according to a first classification label to obtain a plurality of associative word classification groups. Wherein, the first classification label can be such labels as the first character of the alternative associative word, the book author corresponding to the alternative associative word, the book category and so on. For example, alternative associative words with the first character being "I" can be sorted into the same associative word classification group, and for example, alternative associative words corresponding to the same author can be sorted into the same associative word classification group.

After obtaining a plurality of associative word classification groups, the search information can be matched with the first classification label of each associative word classification group, so that the alternative associative word classification group can be determined among the plurality of associative word classification groups according to the matching result, and the first associative word can be determined from the alternative associative word classification group.

After the first associative word is determined, the alternative associative words corresponding to the second book attribute dimension can be obtained, and an alternative associative word, among the alternative associative words, that includes the same feature as the first associative word can be determined as the second associative word. Here, "including the same feature" can be understood as that books corresponding to the first associative word and the second associative word are the same book.

In actual implementation, corresponding book label can be preset for the alternative associative word in the first book attribute dimension and the alternative associative word in the second book attribute dimension, respectively, so as to determine the book corresponding to each alternative associative word by the book label. Here, the book label of the alternative associative word in the second book attribute dimension can be matched with the book label of the alternative associative word in the first book attribute dimension, so as to determine a successfully matched alternative associative word in the second book attribute dimension and determine the successfully matched alternative associative word as the second associative word.

After acquiring the search associative words, search associative words can be displayed in an interface area other than the search tag, which includes particularly steps of the following:

Step S41: determining a display tag of the search associative word, wherein, the display tag is a tag for indicating the book attribute dimension to which the search associative word belongs;

Step S42: displaying the search associative word in the other interface area according to the display tag.

In the embodiment of the present disclosure, the display tag of the first associative word and the display tag of the second associative word in the search associative words can be determined. Here, since the display tag is associated with the book attribute dimension, the display tag of the first associative word can be determined based on the first book attribute dimension, and the display tag of the second associative word can be determined based on the second book attribute dimension, wherein, the display tags corresponding to different book attribute dimensions are different.

For example, for the protagonist's name, the display tag can be a logo including the word "protagonist"; for a further example, for the book title, the display tag can be the symbol "《 》"; for a furthermore example, for the book category, the display tag can be a logo including the word "category". The form of the display tag is not specifically limited in the present disclosure, and is subject to what can be realized.

Figure 3:
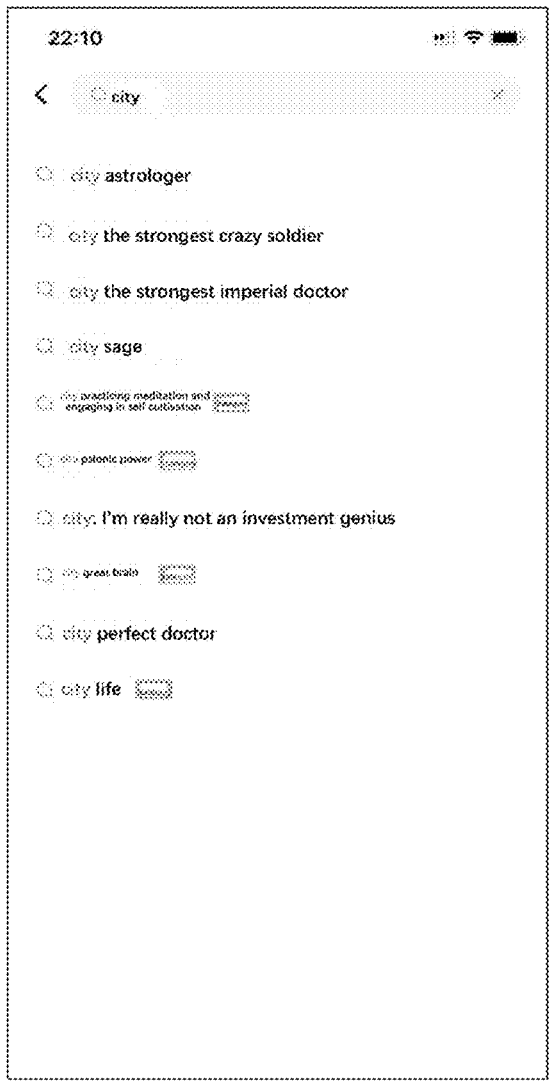
FIG. 3 is a schematic diagram showing the display effect of another search associative word provided by an embodiment of the present disclosure.

For example, as shown in FIG. 2, the search associative word includes a first associative word (the protagonist's name Gao Xiao) and a second associative word (Brother Xiu Xian became a group pet after he came back). Wherein, as shown in FIG. 2, the display tag of the protagonist's name is a gray square logo including the word "protagonist", and the display tag of the book title is the symbol "《 》". For example, as shown in FIG. 3, the search associative word includes a first associative word (book category MM city) and a second associative word (book category NN psionic power). Wherein, as shown in FIG. 3, the display tag of the book category is a gray square logo including the word "category".

After determining the display tag of the search associative word, the search associative word can be displayed in the other interface area according to the display tag.

For example, as shown in FIG. 2, a gray square logo including the word "protagonist" is displayed on the right side of the first associative word, and the symbol "《 》" is added at both ends of the book title of the second associative word. For example, as shown in FIG. 3, a gray square logo including the word "category" is displayed on the right side of the second associative word.

In an alternative embodiment, the step S42 of displaying the search associative word in the other interface area according to the display logo, includes particularly steps of the following:

Step S421: determining the splicing style of the first associative word and the second associative word based on the first book attribute dimension and the second book attribute dimension;

Step S422: displaying the search associative words in a first region of the other interface area according to the splicing style, and displaying the display tags of the search associative words in a second region of the other interface area, wherein the second region is a region adjacent to the first region.

In the embodiment of the present disclosure, after determining the display tag of the first associative word and the display tag of the second associative word, it needs to splice the first associative word and the second associative word and display them in the other interface area. Here, it needs to determine the splicing style of the first associative word and the second associative word.

In actual implementation, the splicing style of the first associative word and the second associative word can be determined based on the first book attribute dimension of the first associative word and the second book attribute dimension of the second associative word. Wherein, the splicing styles differ, depending on different combinations of the first book attribute dimension and the second book attribute dimension.

Here, a style table can be preset, wherein the style table includes splicing styles, and the first book attribute dimension and the second book attribute dimension corresponding to the splicing styles. Thus, the splicing styles of the first associative word and the second associative word that match the first book attribute dimension and the second book attribute dimension can be found in the style table.

After determining the splicing style, the search associative words can be displayed in a first region of the other interface area according to the splicing style, and the display tags of the search associative words can be displayed in a second region of the other interface area, wherein the first region is a display area below the search tag in the search page, and the second region is a region adjacent to the first region.

As shown in FIG. 2, the search associative word includes a first associative word (the protagonist's name Gao Xiao) and a second associative word (Brother Xiu Xian became a group pet after he came back). Here, the splicing style of the first associative word and the second associative word is shown in FIG. 2, that is, the protagonist name and the book title are spliced by being separate. Here, the protagonist's name is displayed on the left side of the first region, the book title is displayed on the right side of the first region, and the protagonist's name and the book title are not adjacent. As shown in FIG. 2, the display tag of the protagonist's name is located on the right side of the protagonist's name and shown adjacent to the protagonist's name, and the display tag of the book title is located at both ends of the book title.

As shown in FIG. 3, the search associative word includes a first associative word (book category MM: city) and a second associative word (book category NN: psionic power). Here, the splicing style of the first associative word and the second associative word is shown in FIG. 3, that is, the book category and the book category are spliced in an adjacent manner. Here, the book category MM is displayed at the left position of the first region, the book category NN is displayed at the right position of the first region, and the book category MM and the book category NN are adjacent. As shown in FIG. 3, the display tags of the book category MM and the book category NN are located on the right side of the book category NN and shown adjacent to the book category NN.

In an alternative embodiment, the step S421 of determining the splicing style of the first associative word and the second associative word based on the first book attribute dimension and the second book attribute dimension, includes particularly steps of the following:

Firstly, determining hierarchical information between the first associative word and the second associative word, in a case where the first book attribute dimension and the second book attribute dimension are the same;

Secondly, determining a splicing order of the first associative word and the second associative word based on the hierarchical information, and determining the splicing style based on the splicing order.

In the embodiment of the present disclosure, if the first book attribute dimension and the second book attribute dimension are the same, for example, they are both book categories, then the hierarchical information between the first associative word (for example, book category MM) and the second associative word (for example, book category NN) can be determined. For example, if the book category NN falls into the book category MM, it can be determined that the level of the book category MM is higher than that of the book category NN; otherwise, it can be determined that the level of the book category MM is lower than that of the book category NN.

Next, the splicing order of the first associative word and the second associative word can be determined based on the hierarchical information. For example, the first associative word and the second associative word can be spliced according to the hierarchical information in a descending order. If the hierarchical information of the first associative word is higher than that of the second associative word, then the splicing order of the first associative word and the second associative word is: book category MM+book category NN. Here, this splicing order can be determined as the splicing style.

In the above embodiment, by splicing the first associative word and the second associative word according to the hierarchical information, the search associative words can be displayed more intuitively for the user, thereby further improving the search efficiency of the user for books.

It can be understood by those skilled in the art that in the above-mentioned method of specific embodiment, the drafting order of individual steps does not mean strict implementation order and constitutes any limitation on the implementation process, and the specific implementation order of individual steps should be determined according to function and possible internal logic.

Based on the same inventive concept, the embodiment of the present disclosure also provides a data display device corresponding to the data display method. Since the principle of solving problem by the device in the embodiment of the present disclosure is similar to the above-mentioned data display method in the embodiment of the present disclosure, the implementation of the device can refer to the implementation of the method, and will not be repeated here.

Figure 4:
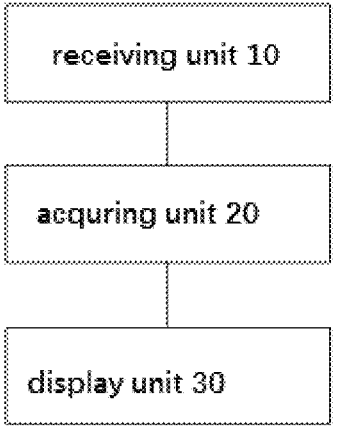
FIG. 4 is a schematic diagram of a data display device provided by an embodiment of the present disclosure.

Referring to FIG. 4, it shows a schematic diagram of a data display device provided by an embodiment of the present disclosure, the device including a receiving unit 10, an acquiring unit 20, and a display unit 30, wherein, the receiving unit is configured to receive search information in response to a trigger operation on a search tag, and wherein the search information corresponds to at least one first book attribute dimension, the first book attribute dimension is associated with at least one second book attribute dimension; wherein the acquiring unit is configured to acquire a search associative word based on the search information, wherein the search associative word includes a first associative word and a second associative word, the first associative word is determined according to the search information and the first book attribute dimension, and the second associative word is determined according to the second book attribute dimension;

wherein the display unit is configured to display the search associative word in an interface area other than the search tag.

In the embodiment of the present disclosure, after the trigger operation on the search tag is detected, the search information corresponding to at least one first book attribute dimension can be received, wherein the first book attribute dimension is associated with at least one second book attribute dimension. Thereafter, the search associative word can be obtained based on the search information, and the search associative word includes the first associative word and the second associative word. Wherein, the first associative word is determined according to the search information and the first book attribute dimension, and the second associative word is determined according to the second book attribute dimension. After the search associative words are acquired, the search associative words can be displayed in an interface area other than the search tag.

In the embodiment of the present disclosure, by arranging the first book attribute dimension to be associated with at least one second book attribute dimension, when the search information corresponding to at least one book attribute dimension is received, a first associative word is determined based on a first book attribute dimension, and a second associative word is determined based on a second book attribute dimension associated with the first book attribute dimension. Thereafter, the first associative word and the second associative word can be displayed for a user at the same time. By such a processing manner, search associative words of search information can be enriched, and associative words of various attribute dimensions can be acquired, so as to meet the diversified search needs of the user.

In a possible embodiment, the device can also be used to determine the at least one first book attribute dimension by: determining first book information including at least part of the search information; determining candidate book attribute dimensions based on the information dimension to which the first book information belongs; determining the first book attribute dimension based on the candidate book attribute dimension that matches a search target of the search information among the candidate book attribute dimensions.

In a possible embodiment, the device is further configured to determine the second book attribute dimension associated with each of the first book attribute dimensions by: determining feature information of each preset book feature, wherein the feature information is used for indicating feature associative information between the first book attribute dimension and the preset book feature, and/or for indicating the probability that the search target of the search information is the book information corresponding to the preset book feature; determining the second book attribute dimension associated with the first book attribute dimension based on the feature information.

In a possible embodiment, the device is further configured for determining a target book that matches the search information; determining the target feature information of the target book for each of the preset book features, and determining the second book attribute dimension associated with the first book attribute dimension based on the target feature information.

In a possible embodiment, the acquiring unit is also configured for, in a case where the first book attribute dimension comprises a plurality of first book attribute dimensions, and a plurality of second book attribute dimensions associated with different said first book attribute dimension are not completely the same, acquiring a search associative word corresponding to each first book attribute dimension based on the search information to obtain a plurality of search associative words, wherein the search associative word corresponding to each first book attribute dimension includes a first associative word and a plurality of second associative words, and the plurality of second associative words are determined according to each second book attribute dimension associated with the first book attribute dimension.

In a possible embodiment, the device is further configured to determine the first search subject and the second associative word by: determining an alternative associative word including the search information as the first associative word among the alternative associative words corresponding to the first book attribute dimension; determining that an alternative associative word of the alternative associative words corresponding to the second book attribute dimension that includes the same feature as the first associative word, as the second associative word.

In a possible embodiment, the display unit is further configured for determining a display tag of the search associative word, wherein, the display tag is a tag for indicating the book attribute dimension to which the search associative word belongs; displaying the search associative word in the other interface area according to the display tag.

In a possible embodiment, the display unit is further configured for determining the display tag of the first associative word based on the first book attribute dimension; determining the display tag of the second associative word based on the second book attribute dimension, wherein, the display tags corresponding to different book attribute dimensions are different.

In a possible embodiment, the display unit is further configured for determining a splicing style of the first associative word and the second associative word based on the first book attribute dimension and the second book attribute dimension; displaying the search associative words in a first region of the other interface area according to the splicing style, and displaying the display tags of the search associative words in a second region of the other interface area, wherein the second region is a region adjacent to the first region.

In a possible embodiment, the display unit is further configured for determining hierarchical information between the first associative word and the second associative word in a case where the first book attribute dimension and the second book attribute dimension are the same; determining a splicing order of the first associative word and the second associative word based on the hierarchical information, and determining the splicing style based on the splicing order.

For the processing flow of individual units in the device and interaction flow between individual units, one may refer to the relevant recitation in the above method embodiments, and will not be described in detail here.

Embodiment 2

Figure 5:
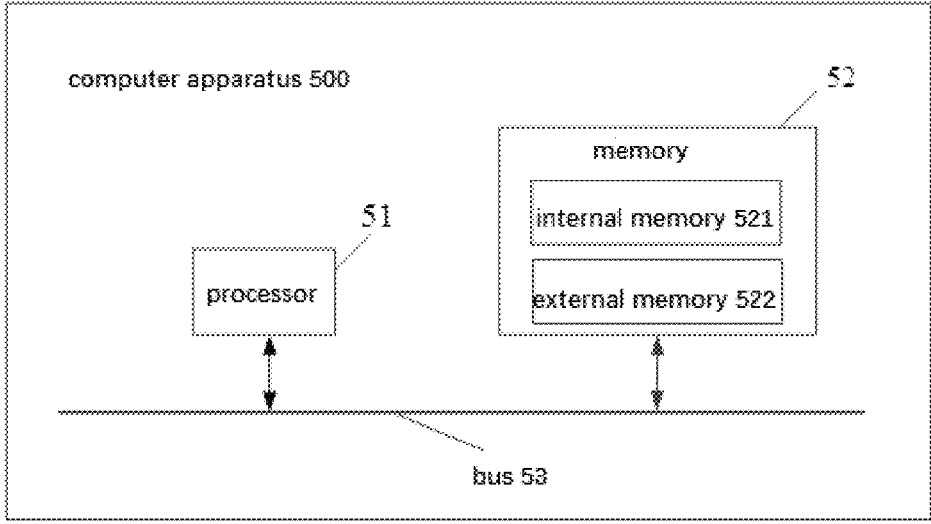
FIG. 5 is a schematic diagram of a computer apparatus provided by an embodiment of the present disclosure.

Corresponding to the data display method as shown in FIG. 1, the embodiment of the present disclosure also provides a computer apparatus 500. As shown in FIG. 5, it shows a structural schematic diagram of the computer apparatus 500 provided by the embodiment of the present disclosure, the apparatus including: a processor 51, a memory 52, and a bus 53, wherein the memory 52 is configured for storing execution instructions and includes an internal memory 521 and an external memory 522, wherein the internal memory 521 is also called a memory that is configured to temporarily store operation data of the processor 51 and data to be exchanged with the external memory 522 such as a hard disk, wherein the processor 51 exchanges data with the external memory 522 through the internal memory 521, wherein, when the computer apparatus 500 operates, the processor 51 communicates with the memory 52 through the bus 53, such that the processor 51 executes the following instructions:

receiving search information in response to a trigger operation on a search tag, wherein the search information corresponds to at least one first book attribute dimension, the first book attribute dimension is associated with at least one second book attribute dimension;

acquiring a search associative word based on the search information, wherein the search associative word includes a first associative word and a second associative word, the first associative word is determined according to the search information and the first book attribute dimension, and the second associative word is determined according to the second book attribute dimension;

displaying the search associative word in an interface area other than the search tag.

Embodiment 3

The embodiment of the present disclosure further provides a computer-readable storage medium, on which a computer program is stored, and the computer program, when executed by the processor, implements steps of the data display method in the above method embodiment. Wherein the storage medium can be a volatile or nonvolatile computer-readable storage medium.

The embodiment of the present disclosure also provides a computer program product, which carries a program code, and the program code includes instructions that can be used to execute the steps of the data display method recited in the above-mentioned method embodiment. For details, one may refer to the above-mentioned method embodiment, which is not repeated here.

Wherein, the above computer program product can be realized by hardware, software or the combination thereof. In an alternative embodiment, the computer program product is embodied as a computer storage medium, and in another alternative embodiment, the computer program product is embodied as a software product, such as a Software Development Kit (SDK) or the like.

It can be clearly understood by those skilled in the art that for the convenience and conciseness of description, the specific working process of the system, device and apparatus described above can refer to the corresponding process in the aforementioned method embodiment, and will not be repeated here. In several embodiments provided by the present disclosure, it should be understood that the disclosed system, device, apparatus and method can be realized in other manners. The device/apparatus embodiments described above are only schematic. For example, the division of the units is only a logical function division, and there may be another division method in actual implementation. For example, multiple units or components may be combined or integrated into another system, or some features may be ignored or not implemented. On the other hand, the mutual coupling or direct coupling or communicative connection shown or discussed can be indirect coupling or communicative connection through some communicative interfaces, devices or units, which can be in electrical, mechanical or any other form.

Units described as separate components may or may not be physically separated, and components displayed as units may or may not be physical units, that is, they may be located in one place or distributed to multiple network units. Some or all of the units can be selected according to actual needs to achieve the purpose of this embodiment.

In addition, individual functional units in each embodiment of the present disclosure may be integrated into one processing unit, or individual units may exist physically alone, or two or more units may be integrated into one unit.

If the function is realized in the form of a software functional unit and sold or used as an independent product, it can be stored in a processor-executable nonvolatile computer-readable storage medium. Based on this understanding, the technical solution of the present disclosure essentially or the part contributing to the state of art or part of the technical solution can be embodied in the form of a software product, which is stored in a storage medium and includes several instructions configured to cause a computer apparatus (which can be a personal computer, a server, a network device, etc.) to execute all or part of the steps of the method described in various embodiments of the present disclosure. The aforementioned storage media include USB flash disk, mobile hard disk, Read-Only Memory (ROM), Random Access Memory (RAM), magnetic disk or optical disk and other media that can store program codes.

Finally, it should be noted that the above-mentioned embodiments are only specific embodiments of the present disclosure, which are used to describe the technical solution of the present disclosure, but not to limit it. Although a detailed description is given to the present disclosure with reference to preferred embodiments, a person skilled in the art should understand that, any technical person familiar with the technical field can still modify the technical solution described in the above embodiment or easily anticipate of varying, or replacing some technical features with equivalents within the technical scope disclosed in the present disclosure. However, these modifications, variations or replacements do not cause the essence of the corresponding technical solution to deviate from the spirit and scope of the technical solution of the embodiment of the present disclosure, and should be included in the protection scope of the present disclosure. Therefore, the scope of protection of the present disclosure should be based on the scope of protection of the claims.

What is claimed is:

1. A computer-implemented data display method, comprising:

receiving, by a process of the computer, search information input by a user in response to a trigger operation on a search tag in an interface area displayed on the computer, and sending the search information to a server, wherein the search information corresponds to at least one first book attribute dimension, the first book attribute dimension is associated with at least one second book attribute dimension;

acquiring, by the process of the computer, a search associative word fed back from the server based on the search information, wherein the search associative word comprises a first associative word and a second associative word, the first associative word is determined according to the search information and the first book attribute dimension, and the second associative word is determined according to the second book attribute dimension;

displaying, by the process of the computer, the search associative word in an interface area, displayed on the computer, other than the search tag, wherein the displaying the search associative word in an interface area other than the search tag comprises:

determining, by the process of the computer, a display tag of the search associative word, wherein, the display tag is a tag for indicating the book attribute dimension to which the search associative word belongs;

displaying, by the process of the computer, the search associative word in the other interface area according to the display tag; and wherein the displaying, by the process of the computer, the search associative words in the other interface area according to the display tags comprises:

determining, by the process of the computer, a splicing style of the first associative word and the second associative word based on the first book attribute dimension and the second book attribute dimension;

displaying, by the process of the computer, the search associative words in a first region of the other interface area according to the splicing style, and displaying the display tags of the search associative words in a second region of the other interface area, wherein the second region is a region laterally adjacent to the first region, and wherein different combinations of the first book attribute dimension and the second book attribute dimension correspond to different splicing styles, and wherein the display tags are configured for indicating book attribute dimensions, and different book attribute dimensions have different forms of display tags.

2. The method according to claim 1, wherein the at least one first book attribute dimension is determined by:

determining, by the process of the computer, first book information including at least part of the search information;

determining, by the process of the computer, candidate book attribute dimensions based on the information dimension to which the first book information belongs;

determining, by the process of the computer, the first book attribute dimension based on the candidate book attribute dimension that matches a search target of the search information among the candidate book attribute dimensions.

3. The method according to claim 1, wherein the second book attribute dimension associated with each of the first book attribute dimensions is determined by:

determining, by the process of the computer, feature information of each preset book feature, wherein the feature information is used for at least one of indicating feature associative information between the first book attribute dimension and the preset book feature or indicating the probability that the search target of the search information is the book information corresponding to the preset book feature;

determining, by the process of the computer, the second book attribute dimension associated with the first book attribute dimension based on the feature information.

4. The method according to claim 3, further comprises determining, by the process of the computer, a target book that matches the search information;

wherein determining, by the process of the computer, second book attribute dimension associated with the first book attribute dimension based on the feature information comprises determining, by the process of the computer, the target feature information of the target book for each of the preset book features, and determining the second book attribute dimension associated with the first book attribute dimension based on the target feature information.

5. The method according to claim 1, wherein the first book attribute dimension comprises a plurality of first book attribute dimensions, and a plurality of second book attribute dimensions associated with different said first book attribute dimensions are not completely the same;

wherein the acquiring, by the process of the computer, a search associative word fed back from the server based on the search information comprises:

acquiring, by the process of the computer, a search associative word corresponding to each first book attribute dimension based on the search information to obtain a plurality of search associative words, wherein the search associative word corresponding to each first book attribute dimension comprises a first associative word and a plurality of second associative words, and the plurality of second associative words are determined according to each second book attribute dimension associated with the first book attribute dimension.

6. The method according to claim 1, wherein the first search subject and the second associative word are determined by:

determining, by the process of the computer, an alternative associative word that comprises the search information as a first associative word among the alternative associative words corresponding to the first book attribute dimension;

determining, by the process of the computer, that an alternative associative word that comprises the same feature as the first associative word among the alternative associative words corresponding to the second book attribute dimension is the second associative word.

7. The method according to claim 1, wherein the determining, by the process of the computer, the display tag of the search associative word comprises:

determining, by the process of the computer, the display tag of the first associative word based on the first book attribute dimension;

determining, by the process of the computer, the display tag of the second associative word based on the second book attribute dimension.

8. The method according to claim 1, wherein the determining, by the process of the computer, the splicing style of the first associative word and the second associative word based on the first book attribute dimension and the second book attribute dimension comprises:

determining, by the process of the computer, hierarchical information between the first associative word and the second associative word in a case where the first book attribute dimension and the second book attribute dimension are the same;

determining, by the process of the computer, a splicing order of the first associative word and the second associative word based on the hierarchical information, and determining the splicing style based on the splicing order.

9. A computer apparatus, comprising:

a processor, and a memory coupled to the processor, wherein the memory is configured to store machine-readable instructions executable by the processor, and the machine-readable instructions, when executed by the processor, cause the processor to:

receive search information input by a user in response to a trigger operation on a search tag an interface area displayed on the computer, and send the search information to a server, wherein the search information corresponds to at least one first book attribute dimension, the first book attribute dimension is associated with at least one second book attribute dimension;

acquire a search associative word fed back from the server based on the search information, wherein the search associative word comprises a first associative word and a second associative word, the first associative word is determined according to the search information and the first book attribute dimension, and the second associative word is determined according to the second book attribute dimension;

display the search associative word in an interface area, displayed on the computer, other than the search tag, wherein the machine-readable instructions for displaying the search associative word in an interface area other than the search tag further cause the processor to:

determine a display tag of the search associative word, wherein, the display tag is a tag for indicating the book attribute dimension to which the search associative word belongs;

display the search associative word in the other interface area according to the display tag; and wherein the machine-readable instructions for displaying the search associative words in the other interface area according to the display tags further causes the processor to:

determine a splicing style of the first associative word and the second associative word based on the first book attribute dimension and the second book attribute dimension;

display the search associative words in a first region of the other interface area according to the splicing style, and display the display tags of the search associative words in a second region of the other interface area, wherein the second region is a region laterally adjacent to the first region, and wherein different combinations of the first book attribute dimension and the second book attribute dimension correspond to different splicing styles, and wherein the display tags are configured for indicating book attribute dimensions, and different book attribute dimensions have different forms of display tags.

10. The computer apparatus according to claim 9, wherein the at least one first book attribute dimension is determined by:

determining, by the processor, first book information including at least part of the search information;

determining, by the processor, candidate book attribute dimensions based on the information dimension to which the first book information belongs;

determining, by the processor, the first book attribute dimension based on the candidate book attribute dimension that matches a search target of the search information among the candidate book attribute dimensions.

11. Computer apparatus according to claim 9, wherein the second book attribute dimension associated with each of the first book attribute dimensions is determined by:

determining, by the processor, feature information of each preset book feature, wherein the feature information is used for at least one of indicating feature associative information between the first book attribute dimension and the preset book feature or indicating the probability that the search target of the search information is the book information corresponding to the preset book feature;

determining, by the processor, the second book attribute dimension associated with the first book attribute dimension based on the feature information.

12. The computer apparatus according to claim 11, further comprises machine-readable instructions for determining a target book that matches the search information;

wherein the machine-readable instructions for determining, by the processor, the second book attribute dimension associated with the first book attribute dimension based on the feature information further cause the processor to determine the target feature information of the target book for each of the preset book features, and determine the second book attribute dimension associated with the first book attribute dimension based on the target feature information.

13. The computer apparatus according to claim 9, wherein the first book attribute dimension comprises a plurality of first book attribute dimensions, and a plurality of second book attribute dimensions associated with different said first book attribute dimensions are not completely the same;

the machine-readable instructions for acquiring the search associative word fed back from the server based on the search information further cause the processor to:

acquire a search associative word corresponding to each first book attribute dimension based on the search information to obtain a plurality of search associative words, wherein the search associative word corresponding to each first book attribute dimension comprises a first associative word and a plurality of second associative words, and the plurality of second associative words are determined according to each second book attribute dimension associated with the first book attribute dimension.

14. The computer apparatus according to claim 9, wherein the first search subject and the second associative word are determined by:

determining, by the processor, an alternative associative word that comprises the search information as a first associative word among the alternative associative words corresponding to the first book attribute dimension;

determining, by the processor, that an alternative associative word that comprises the same feature as the first associative word among the alternative associative words corresponding to the second book attribute dimension is the second associative word.

15. The computer apparatus according to claim 9, wherein the machine-readable instructions for determining the display tag of the search associative word further cause the processor to:

determine the display tag of the first associative word based on the first book attribute dimension;

determine the display tag of the second associative word based on the second book attribute dimension.

16. A non-transitory computer-readable storage medium having computer program stored thereon, the computer program, when executed by the processor, causes the processor to:

receive search information input by a user in response to a trigger operation on a search tag in an interface area displayed on a computer, and sending the search information to a server, wherein the search information corresponds to at least one first book attribute dimension, the first book attribute dimension is associated with at least one second book attribute dimension;

acquire a search associative word fed back from the server based on the search information, wherein the search associative word comprises a first associative word and a second associative word, the first associative word is determined according to the search information and the first book attribute dimension, and the second associative word is determined according to the second book attribute dimension;

display the search associative word in an interface area, displayed on the computer, other than the search tag, wherein the machine-readable instructions for displaying the search associative word in an interface area other than the search tag further cause the processor to:

determine a display tag of the search associative word, wherein, the display tag is a tag for indicating the book attribute dimension to which the search associative word belongs;

display the search associative word in the other interface area according to the display tag; and wherein the machine-readable instructions for displaying the search associative words in the other interface area according to the display tags further causes the processor to:

determine a splicing style of the first associative word and the second associative word based on the first book attribute dimension and the second book attribute dimension;

display the search associative words in a first region of the other interface area according to the splicing style, and display the display tags of the search associative words in a second region of the other interface area, wherein the second region is a region laterally adjacent to the first region, and wherein different combinations of the first book attribute dimension and the second book attribute dimension correspond to different splicing styles, and wherein the display tags are configured for indicating book attribute dimensions, and different book attribute dimensions have different forms of display tags.

* * * * *